Figure 1:
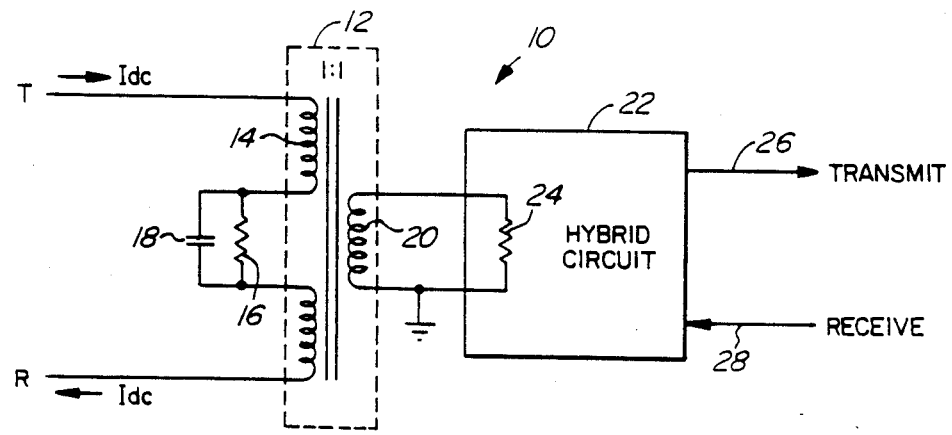

United States Patent [19]

Jakab

[11] Patent Number: 4,982,426
[45] Date of Patent: Jan. 1, 1991

[54] TELECOMMUNICATIONS LINE INTERFACE CIRCUITS

[75] Inventor: Gyula Jakab, Alpharetta, Ga.

[73] Assignee: Northern Telecom Limited, Montreal, Canada

[21] Appl. No.: 299,111

[22] Filed: Jan. 19, 1989

[51] Int. Cl.⁵ .................. H04M 9/08; H04B 1/58
[52] U.S. Cl. ................................ 379/402; 379/399
[58] Field of Search ............ 379/402, 403, 405, 413, 379/391, 392, 399, 338, 345; 370/32.1, 32

[56] References Cited

U.S. PATENT DOCUMENTS

| | | | |
|---|---|---|---|
| 1,564,391 | 12/1925 | Wilbur | 379/345 |
| 3,189,693 | 6/1965 | Fudaley | 379/402 |
| 3,596,011 | 7/1971 | Alexandrovich | 379/402 X |
| 3,824,344 | 7/1974 | James et al. | 379/338 X |
| 3,934,099 | 1/1976 | Elder, Jr. | 379/402 |
| 4,595,802 | 6/1986 | Wittman | 370/32.1 |

FOREIGN PATENT DOCUMENTS

| | | | |
|---|---|---|---|
| 0211813 | 12/1982 | Japan | 379/338 |
| 0095692 | 5/1986 | Japan | 379/402 |

OTHER PUBLICATIONS

IEEE Standard Dictionary of Electrical and Electronic Terms, 1977, p. 587.

Primary Examiner—James L. Dwyer
Attorney, Agent, or Firm—Dallas F. Smith; R. John Haley

[57] ABSTRACT

A two-wire telephone line interface circuit includs two transformers each having primary and secondary windings. The primary windings, which are divided into equal halves for balance and d.c. feed purposes, are connected in series between the two wires, and the winding resistance together with optional series resistance provide desired d.c. resistance across the line. To this end one or both of these windings may comprise resistance wire. A signal from a receive line is coupled to the two-wire line via an amplifier whose low output impedance terminates the secondary of one of the transformers. Another amplifier couples a signal from the two-wire line and the secondary of the other transformer to a transmit line, and also provides at its input a transhybrid signal cancellation node, a transhybrid signal being coupled thereto via a balance impedance. A feedback path can be provided for increasing the a.c. impedance presented by the interface circuit to the line. A four-wire telecommunications line interface circuit using similar transformers is also described.

24 Claims, 3 Drawing Sheets

TELECOMMUNICATIONS LINE INTERFACE CIRCUITS

This invention relates to telecommunications line interface circuits.

In line interface circuits for two-wire and four-wire telecommunications lines, e.g. telephone lines, it is common to provide a transformer in view of its desirable common mode signal rejection and ground isolation characteristics. In telephone applications such lines usually must be able to conduct a substantial direct current, typically up to about 60 mA, which also flows through a primary winding of the transformer. In addition, a line terminating impedance, typically of 600 to 900 ohms, is reflected from the secondary to the primary winding of the transformer to match the impedance of the line.

To achieve a desired low cut-off frequency of 50 Hz or less, the primary winding of such a transformer must provide an inductance of several Henries, necessitating a large number of turns of the primary winding even using a ferrite core transformer. To avoid magnetic flux saturation of the transformer core as a result of the direct current flowing through this large number of turns, the transformer must be physically large, and consequently expensive. The transformer size also creates a significant problem in trying to provide compact arrangements of many line interface circuits.

An object of this invention, therefore, is to provide an improved line interface circuit which reduces such disadvantages.

According to one aspect this invention provides a telecommunications line interface circuit for coupling a telecommunications line to a transmit line and a receive line, comprising: a first transformer having a first winding for coupling to the telecommunications line and having a second winding; a first amplifier having an input for coupling to the receive line and having an output coupled to the second winding of the first transformer and providing a low impedance termination thereof; a second transformer having a first winding for coupling to the telecommunications line and having a second winding; a second amplifier having an input coupled to the second winding of the second transformer and an output for coupling to the transmit line; and means interconnecting the first windings of the first and second transformers for conducting a direct current on the telecommunications line through said first windings.

In such a line interface circuit, the second winding of the first transformer is terminated by a low (close to zero) impedance provided by the output of the first amplifier, whereby only a relatively small impedance, arising primarily from the resistance of the second winding of the first transformer, is reflected from this second winding to the first winding. Consequently, a significant part of the (typically 600 to 900 ohm) terminating impedance for the line is constituted by the resistance of the first winding of the first transformer. To this end, this first winding of the first transformer conveniently comprises resistance wire. Other windings of both transformers may similarly, if desired, comprise resistance wire, or may comprise copper wire as is conventional in transformer technology.

Reference is directed in this respect to Jakab United States patent application Ser. No. 061,593 filed June 15, 1987 and entitled "Subscriber Line Interface Circuit and Transformer Therefor", the entire disclosure of which is hereby incorporated herein by reference.

The term "resistance wire" is used herein to mean wire which, for the same cross-sectional size and shape, has a greater resistance per unit length than copper wire.

Applied to a two-wire telecommunications line, preferably the first windings of the first and second transformers are connected in series, the circuit further comprising a balance impedance coupled between an input of the second amplifier, acting as a summing node for transhybrid signal cancellation, and either the output of the first amplifier or the receive line. In the latter case, the circuit may include a third amplifier having an input coupled to the second winding of the second transformer and having an output, and an impedance coupled between the output of the third amplifier and an input of the first amplifier; the impedance in this arrangement serves to increase, in an easily controllable manner, the a.c. impedance which the line interface circuit presents to the two-wire telecommunications line without increasing the d.c. resistance presented by the line interface circuit to the telecommunications line.

To facilitate providing a balanced interface circuit for a two-wire telecommunications line which is balanced with respect to ground, preferably the first winding of one of the first and second transformers comprises two substantially equal winding halves, and the first winding of the other of the first and second transformers is connected between said winding halves and in series therewith. The interface circuit can be made even more fully balanced if the first winding of the other of the first and second transformers also comprises two substantially equal winding halves, coupled in series.

Applied to a four-wire telecommunications line, preferably the first windings of the first and second transformers are center-tapped windings arranged for coupling each to a respective pair of wires of the four-wire telecommunications line, the means interconnecting the first windings comprising a connection between center taps of the first windings.

According to another aspect this invention provides an interface circuit for a two-wire telecommunications line, comprising: first and second transformers each having first and second windings, the first windings of the first and second transformers being coupled in series with one another for connection across the two wires of a two-wire telecommunications line; a receive path for coupling a receive line to the second winding of the first transformer and for terminating this winding with a low impedance; a transmit path for coupling the second winding of the second transformer to a transmit line; and a balance impedance coupled between the transmit path and the receive path.

According to a further aspect this invention provides an interface circuit for a four-wire telecommunications line, comprising: first and second transformers each having a center-tapped first winding and a second winding, the first windings of the first and second transformers being arranged for coupling each to a respective pair of wires of a four-wire telecommunications line; connection means between the center taps of the first windings; a first amplifier having an output coupled to the second winding of the first transformer and providing a low impedance termination thereof, for supplying signals via the first transformer to the pair of wires of the four-wire telecommunications line coupled thereto; and a second amplifier having an input coupled to the second winding of the second transformer for deriving signals via the second transformer from the pair of wires of the four-wire telecommunications line coupled thereto.

The invention also provides apparatus comprising: a telecommunications line comprising two wires for conducting a direct current and carrying an a.c. signal thereon; a transformer having a first winding, coupled to the two wires for conducting said direct current, and a second winding; and an amplifier having an output directly coupled to the second winding and providing a low impedance termination thereof, for supplying an a.c. signal via the transformer to the telecommunications line. At least the first winding of the transformer preferably comprises resistance wire for providing a predetermined resistance.

Correspondingly, the invention also provides a method of interfacing a telecommunications line comprising two wires carrying a direct current, comprising the steps of: coupling a first winding of a transformer to the two wires to conduct said direct current; terminating a second winding of the transformer with a low impedance output of an amplifier; and supplying a signal via the amplifier and the transformer to the two wires.

The invention further provides a method of interfacing a two-wire telecommunications line comprising two wires carrying a direct current in opposite directions, comprising the steps of: coupling first windings of first and second transformers in series between the two wires to conduct said direct current therebetween; terminating a second winding of the first transformer with a low impedance output of a first amplifier; supplying a signal from a receive line via the first amplifier and the first transformer to the two-wire telecommunications line; coupling a second winding of the second transformer via a second amplifier to a transmit line for supplying to the transmit line a signal received via the two-wire telecommunications line; and coupling a component of the signal from the receive line to the second amplifier for substantially cancelling from the signal supplied to the transmit line signal components from the receive line.

Figure 2:
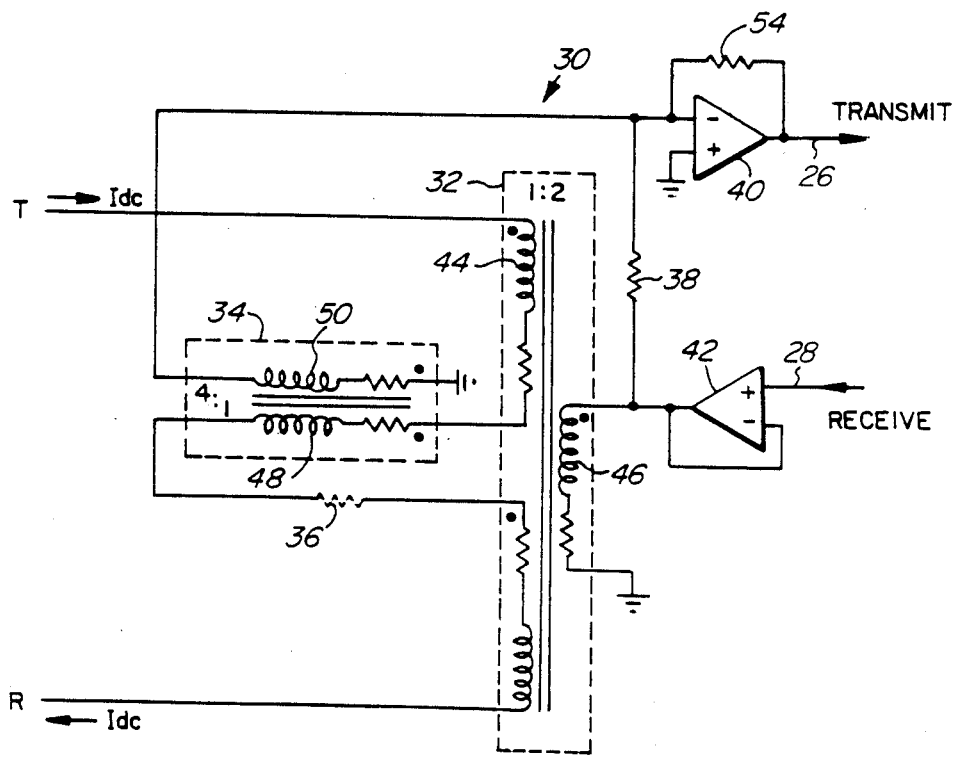
Figure 3:
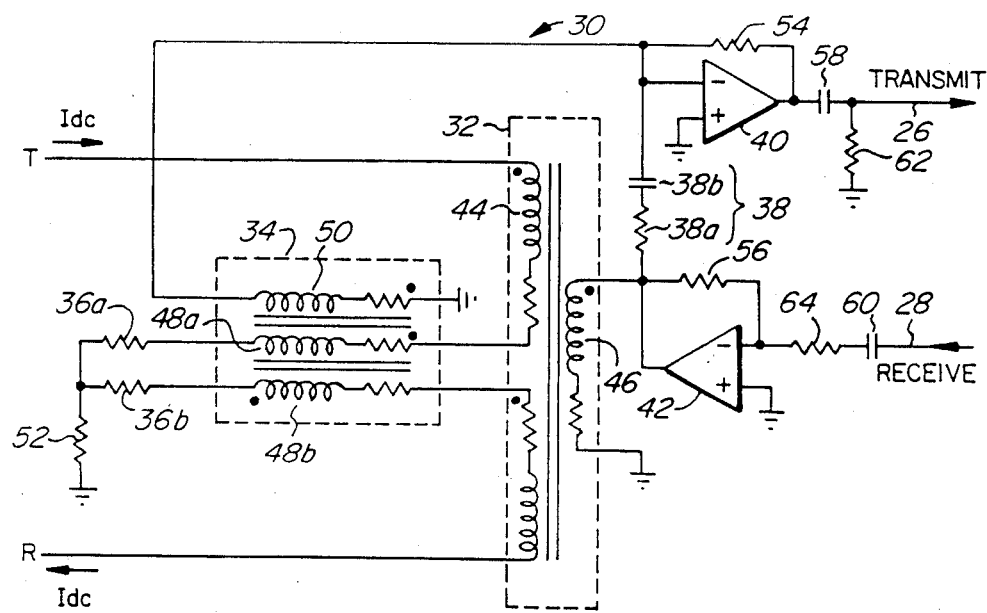
Figure 4:
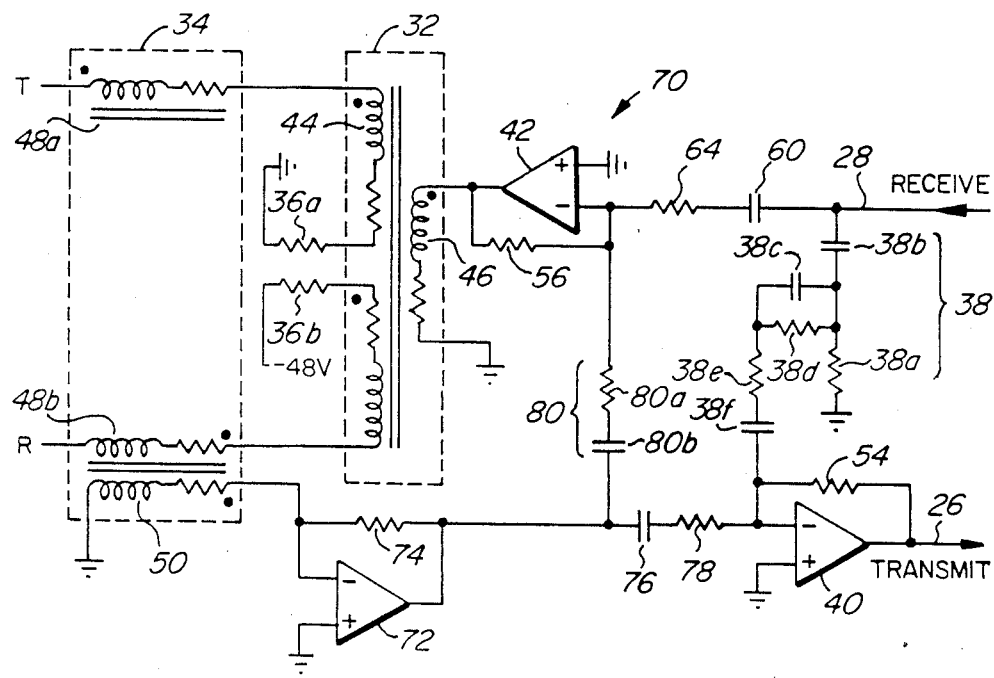
Figure 5:
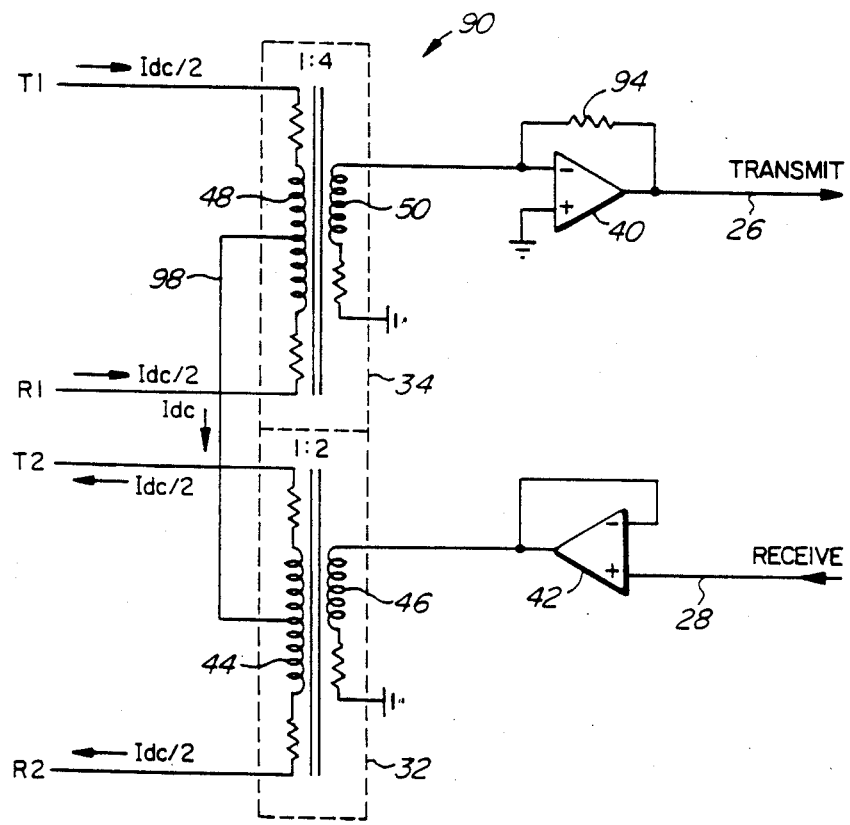

The invention will be further understood from the following description with reference to the accompanying drawings, in which:

FIG. 1 schematically illustrates a known form of two-wire telecommunications line interface circuit;

FIG. 2 schematically illustrates a basic form of a two-wire telecommunications line interface circuit in accordance with an embodiment of this invention;

FIG. 3 schematically illustrates a preferred form of the two-wire telecommunications line interface circuit of FIG. 2;

FIG. 4 schematically illustrates a two-wire telecommunications line interface circuit in accordance with another embodiment of this invention; and FIG. 5 schematically illustrates a four-wire telecommunications line interface circuit in accordance with a further embodiment of this invention.

Referring to FIG. 1, there is illustrated a known form of interface circuit 10 for a two-wire telephone line having a floating direct current path. The two-wire line comprises tip and ring wires T and R respectively carrying a direct current Idc which is typically in the range of 18 to 60 mA, and has an a.c. impedance of 600 to 900 ohms which is matched by the line interface circuit. The line interface circuit 10 comprises a transformer 12 having a split primary winding 14, with two equal halves which are coupled between the tip and ring wires T and R of the line and are coupled together via a resistor 16 for passing the current Idc, and an a.c. bypass capacitor 18, and a secondary winding 20, with a 1:1 turns ratio between the primary winding 14 and the secondary winding 20. The circuit 10 further comprises a hybrid circuit 22, having a terminating impedance 24 which is connected to the secondary winding 20, for coupling signals to a transmit line 26 and from a receive line 28. The terminating impedance 24 of the hybrid circuit 22 is reflected across the primary winding 14 of the transformer 12 to match the line impedance.

For acceptable performance of such a line interface circuit with telephone signals, the circuit must provide a $-3$ dB lower cut-off frequency f of 50 Hz or less. This necessitates that the primary winding 14 have an inductance of at least $R/(2\pi f)$, where R is the line impedance. For $R=900$ ohms and $f=50$ Hz, this primary winding inductance must be at least 2.86 Henries. In order to provide such an inductance, the primary winding 14 must have a large number of turns. In order to avoid saturation of the core of the transformer 12 by the current Idc flowing through this large number of turns, the transformer 12 must be physically large and relatively expensive; typically the transformer must have dimensions of the order of 4 cm $\times$ 3.5 cm $\times$ 2.5 cm and a volume of the order of 35 cm$^3$. Mounting such transformers on printed circuit boards, which are arranged side by side in parallel as is common in telecommunications equipment, necessitates a relatively large spacing between circuit boards, and hence leads to undesirably large equipment sizes.

FIG. 2 illustrates, using references similar to those of FIG. 1 where applicable, a generally basic form of a two-wire line interface circuit 30 in accordance with this invention. As in FIG. 1, the two-wire line in FIG. 2 comprises tip and ring wires T and R balanced with respect to ground and which may carry a loop current Idc in the range of 18 to 60 mA. The line interface circuit 30 comprises two transformers 32 and 34, an optional resistor 36, a balance impedance represented by a resistor 38 but which may also include complex impedance components such as capacitors, and transmit and receive signal amplifiers 40 and 42 respectively, the former having a feedback resistor 54. These components and their interconnections are further described below. The transformers 32 and 34 are ferrite core transformers, types RM8 and RM4 respectively, as described further below, and in the drawings dots adjacent the transformer windings indicate the senses of the windings in conventional manner.

In the line interface circuit 30 of FIG. 2 the transformer 32, like the transformer 12 in the circuit of FIG. 1, has a primary winding 44 which is split into two equal halves, and a secondary winding 46. Each winding has not only an inductive component but also a resistive component, these components being represented schematically in FIG. 2 by an inductor and resistor connected in series. Similarly, the transformer 34 has a primary winding 48 and a secondary winding 50 each having an inductive component and a resistive component as represented schematically in FIG. 2.

The two halves of the primary winding 44 of the transformer 32 are bifilar wound from insulated resistance wire, and for example comprise 2 by 500 turns of 40 AWG type MWS-60 alloy resistance wire, providing each half of the primary winding with a resistance of 335 ohms, for a total primary winding resistance of 670 ohms, and a primary winding inductance of 0.25H (Henry). The secondary winding 46 of the transformer 32 can comprise 2000 turns of 40 AWG copper wire, providing an inductance of 1H, a resistance of 310 ohms, and a primary:secondary turns ratio for the transformer 32 of 1:2.

The amplifier 42 is a differential amplifier acting as a unity-gain buffer for coupling a signal received via the receive line 28, connected to a non-inverting input of the amplifier 42, to the secondary winding 46 which is connected between an output of the amplifier 42 and ground. As the amplifier 42 has a low output impedance, its output constitutes a virtual ground for a.c. signals, whereby the secondary winding 46 operates in a short-circuited mode in which its winding resistance, multiplied by the square of the transformer 32 turns ratio from the secondary to the primary, is reflected at the primary winding 44 of this transformer. Thus there is an impedance of $310*(\frac{1}{2})^2 = 77.5$ ohms reflected at the primary winding 44 from the secondary winding 46. This forms with the primary winding inductance of 0.25H a −3 dB lower cut-off frequency of $77.5/(2*\pi*0.25) = 49.3$ Hz.

The primary winding 44 of the transformer 32 is connected between the wires T and R, as for the transformer 12 of FIG. 1. However, as the secondary winding 46 is terminated by the low output impedance of the amplifier 42, it can not be used for producing a signal voltage for the transmit line 26 as in FIG. 1. In FIG. 2, therefore, the two halves of the primary winding 44 are coupled together via the primary winding 48 of the transformer 34 in series with the optional resistor 36. The secondary winding 50 of the transformer 34 is connected between ground and an inverting input of the transmit amplifier 40, which is a differential amplifier having a non-inverting input which is grounded and an output which is connected to the transmit line 26. The feedback resistor 54 is connected between the output and the inverting input of the amplifier 40. The balance impedance 38 is connected between the output of the amplifier 42 and the inverting input of the amplifier 40 to provide for transhybrid cancellation of signals at the signal summing node constituted by the inverting input of the amplifier 40.

The primary winding 48 of the transformer 34 comprises 112 turns of 40 AWG copper wire providing a resistance of 35.5 ohms and an inductance of 2 mH, and the secondary winding 50 comprises 448 turns of 40 AWG type MWS-60 alloy resistance wire providing a resistance of 30 ohms and an inductance of 32 mH, with a primary:secondary turns ratio of 1:4. The secondary winding 50 is terminated in a low impedance by the virtual ground at the inverting input of the amplifier 40, and consequently the secondary winding 50 provides at the primary winding a reflected impedance of $30*(\frac{1}{4})2 = 1.875$ ohms.

The optional resistor 36 provides a resistance which is selected to pad the total impedance presented to the line wires T and R to match the impedance of the line, in this case 900 ohms. This 900 ohm impedance is made up by the following contributions as discussed above:

| | |
|---|---|
| Resistance of primary winding 44 | 670 |
| Impedance reflected from secondary winding 46 | 77.5 |
| Resistance of primary winding 48 | 35.5 |
| Impedance reflected from secondary winding 50 | 1.875 |
| Padding resistance 36 | 115.125 |
| Total | 900 ohms |

Obviously, the impedances provided by the transformer windings could be increased to eliminate the need for the padding resistance 36, if desired.

In the line interface circuit 30 of FIG. 2, the loop current Idc of up to 60 mA flows through the primary winding 44 of the transformer 32 and through the primary winding 48 of the transformer 34. Because the inductance of the primary winding 48 of the transformer 34 is very low, this current Idc can be accommodated by the small RM4 core of this transformer without saturation. The RM8 core of the transformer 32 is also able to accommodate this current Idc flowing through the primary winding 44, without saturation, because the magnetic flux generated by this current is reduced, relative to the flux in the transformer 12 of FIG. 1, due to the relatively reduced number of turns of this primary winding.

Viewed alternatively, it can be seen that in the line interface circuit 30 of FIG. 2 the line terminating impedance is provided to a large extent by the resistance of the primary winding 44, and to only a small extent by impedance reflected from the secondary winding 46, in contrast to the full 900 ohm terminating impedance 24 in FIG. 1. Consequently, for the same lower cut-off frequency of about 50 Hz, the primary winding 44 can have a much lower inductance than the winding 14 of FIG. 1, and hence can have fewer turns, creating proportionally a much smaller magnetic flux for the same loop current Idc and consequently allowing a much smaller transformer to be used without saturation.

With the characteristics described above, the transformer 32 can have a size of about 2 cm×2 cm×1.78 cm with a volume of about 7.1 cm$^3$, and the transformer can have a size of about 1 cm×1 cm×1 cm with a volume of about 1 cm$^3$, giving a total volume of 8.1 cm$^3$ or less than one quarter the volume of the transformer 12 of FIG. 1. In particular, such transformers are not only smaller and less expensive than the transformer 12 of FIG. 1, but also enable adjacent printed circuit boards on which the transformers are mounted to be spaced apart by significantly reduced distances, resulting in much more compact equipment than is possible with the line interface circuits of FIG. 1.

FIG. 3 illustrates a preferred form of the line interface circuit 30 of FIG. 1; similar references are used to denote similar components, and only the differences from FIG. 2 are described below.

In the circuit 30 of FIG. 3, the primary winding 48 of the transformer 34 is split into two equal halves 48a and 48b, and the padding resistor 36 is similarly split into two equal resistors 36a and 36b, which are connected in series between the two halves of the primary winding 44 of the transformer 32 to provide a fully balanced arrangement. A central junction between the series resistors 36a and 36b is grounded via a relatively high impedance resistor 52. The balance impedance 38 of FIG. 2 is constituted in FIG. 3 by a series-connected resistor 38a and capacitor 38b. FIG. 3 also illustrates feedback resistors 54 and 56 for determining the gain of the amplifiers 40 and 42 respectively, and coupling capacitors 58, 60 and resistors 62, 64 associated with the transmit and receive lines 26 and 28.

It should be appreciated that the order of series connections of the components 44, 48a, and 36a and 44, 48b, and 36b can be changed arbitrarily, for example to be as illustrated in the line interface circuit of FIG. 4 as described below. In addition, it should be appreciated that instead of completing a loop for the current Idc as described and illustrated, the resistors 36a and 36b could instead be connected to ground and −48 volt terminals of a d.c. supply for supplying loop current to the line wires T and R, again as described below for the circuit of FIG. 4.

In the line interface circuits of FIGS. 2 and 3, the line is terminated with a d.c. resistance which is of generally similar magnitude to the a.c. impedance with which the line is terminated. However, in certain situations it is desirable to terminate the line with a relatively high a.c. impedance, for example 900 ohms, and with a significantly lower d.c. resistance, for example 440 ohms or less. FIG. 4 illustrates a modified form of line interface circuit which facilitates this. Again, similar references are used in FIG. 4 to denote components similar to those of FIGS. 2 and 3, and only the modifications are described below.

In the line interface circuit, referenced 70, of FIG. 4, d.c. loop current flows between a −48 volt source and ground via the resistor 36b, one half of the primary winding 44 of the transformer 32, the winding half 48b of the primary winding of the transformer 34, the ring wire R and the tip wire T of the two-wire line, the winding half 48a, the other half of the primary winding 44, and the resistor 36a. The two halves of the winding 44 may each have a resistance of 39.6 ohms, the winding halves 48a and 48b may each have a resistance of 6 ohms, and the resistors 35a and 35b may each have a resistance of 174.5 ohms to provide a total resistance of 440 ohms for d.c. on the line. The resistors 36a and 36b may comprise thick film and PTC resistors, electrically connected in series and thermally coupled with one another, as described in Jakab U.S. Pat. No. 4,467,310 issued Aug. 21, 1984 and entitled "Telephone Subscriber Line Battery Feed Resistor Arrangements".

The receive signal path from the line 28 to the secondary winding 46 of the transformer 32 in the line interface circuit 30 is substantially the same as for the circuit 30 of FIG. 3. For the transmit signal, the amplifier 40, with its feedback resistor 54, has its output coupled to the transmit line 26, its non-inverting input grounded, and its inverting input acting as a summing node for transhybrid signal cancellation in a similar manner to that of FIG. 3. The balance impedance 38 is in this case constituted by resistors and capacitors 38a to 38f coupled between the receive line 28 and this summing node.

In the line interface circuit 70 of FIG. 4, the secondary winding 50 of the transformer 34 is connected between ground and the inverting input of a differential amplifier 72, whose non-inverting input is grounded (so that the inverting input is a virtual ground) and whose output is coupled via a gain-determining feedback resistor 74 to the inverting input and via a coupling capacitor 76 and resistor 78 to the summing node, referred to above, constituted by the inverting input of the amplifier 40. The output of the amplifier 72 is also coupled, via an a.c. impedance controlling impedance 80, constituted in FIG. 4 by a resistor 80a and a capacitor 80b in series, to the inverting input of the amplifier 40 which also acts as a summing node. The impedance 80 serves as described below to control the a.c. impedance presented by the line interface circuit 70 to the line comprising the wires T and R, so that it can be significantly different from the d.c. resistance presented to the line by the circuit 70.

More particularly, the amplifier 72 produces at its output a voltage which is dependent upon the (alternating) current flowing via the line wires T and R. This voltage, as well as being coupled via the amplifier 40 to the transmit line 26 to constitute the transmit signal, is applied via the impedance 80 and the amplifier 42 as a feedback signal to the transformer 32, whereby it increases the a.c. impedance presented to the line by this transformer in accordance with the magnitude and characteristics of the impedance 80. The impedance 80, which can be a simple complex impedance formed by the resistor 80a and capacitor 80b as shown, or a more complicated form of complex impedance, or simply a resistance, thus serves to control the a.c. impedance of the line interface circuit 70.

Although the above described embodiments of the invention relate to two-wire line interface circuits, the invention can also be applied to a line interface circuit for a four-wire line, for example as illustrated for a line interface circuit 90 in FIG. 5.

Referring to FIG. 5, the line interface circuit 90 uses transformers 32 and 34 as in FIGS. 2 and 3 as described above, together with amplifiers 40 and 42, for coupling signals from a first pair of wires T1, R1 to the transmit line 26 and from the receive line 28 to a second pair of wires T2, R2, the two pairs of wires constituting the four-wire line. Each of the four wires carries a loop current Idc/2 as shown, a total loop current Idc flowing towards the line interface circuit via the wires T1, R1, a connecting line 98 from a center tap of the primary winding 44 of the transformer 32 to a center tap of the primary winding 48 of the transformer 34, and away from the line interface circuit 90 via the wires T2, R2.

As in the case of FIG. 2 as described above, in the line interface circuit 90 of FIG. 5 the secondary 46 of the transformer 32 is connected between ground and the output of the amplifier 42, and hence is operated in a short circuited mode whereby its resistance is reflected at the primary winding 44 of this transformer, the resistance of which itself contributes as in FIG. 2 to the impedance presented by the line interface circuit 90 to the wires T2, R2. In the transmit direction, a signal on the wires T2, R2 is coupled via the transformer 34 to the inverting input of the amplifier 40, the output of the amplifier 40 being connected to the transmit line 26 and being coupled via a feedback resistor 94 to the inverting input of the amplifier 40.

It should be appreciated that in the line interface circuit 90, in addition to a size reduction of the transformers for reasons similar to those described above for the two-wire line interface circuits, the core size of the transformers 32 and 34 can be further reduced because the currents Idc/2 flow in opposite directions in the two halves of the primary windings 44 and 48 of these transformers, so that the magnetic flux due to these direct currents cancels in each transformer.

Numerous other variations, modifications, and adaptations may be made to the embodiments of the invention described above within the scope of the invention as defined in the claims.

What is claimed is:

1. An interface circuit for a two-wire telecommunications line, comprising:

first and second transformers each having first and second windings, the first windings of the first and second transformers being coupled in series with one another for connection across the two wires of a two-wire telecommunications line;

a receive path for coupling a receive line to the second winding of the first transformer and for terminating this winding with a low impedance, wherein a significant part of the terminating impedance for the telecommunications line is constituted by the resistance of the first winding of the first transformer;

a transmit path for coupling the second winding of the second transformer to a transmit line; and a balance impedance coupled between the transmit path and the receive path.

2. An interface circuit as claimed in claim 1 wherein the receive path comprises a first amplifier having an input coupled to the receive line and an output coupled to the second winding of the first transformer and providing the low impedance termination thereof.

3. An interface circuit as claimed in claim 1 wherein the first winding of at least one of the first and second transformers comprises resistance wire.

4. An interface circuit as claimed in claim 2 wherein the transmit path comprises a second amplifier having an output coupled to the transmit line and an input coupled to the second winding of the second transformer and to the balance impedance.

5. An interface circuit as claimed in claim 4 and including a third amplifier having an input coupled to the second winding of the second transformer and an output coupled to the input of the second amplifier whereby the second amplifier is coupled to the second winding of the second transformer via the third amplifier, and an impedance coupled between the output of the third amplifier and an input of the first amplifier, the balance impedance being coupled to the receive line.

6. An interface circuit as claimed in claim 5 wherein the first winding of each of the first and second transformers comprises two substantially equal winding halves, and the first winding of one of the first and second transformers is connected between the winding halves of the first winding of the other of the first and second transformers.

7. An interface circuit as claimed in claim 1 wherein the first winding of each of the first and second transformers comprises two substantially equal winding halves, and the first winding of one of the first and second transformers is connected between the winding halves of the first winding of the other of the first and second transformers.

8. An interface circuit as claimed in claim 7 wherein the first winding of at least one of the first and second transformers comprises resistance wire.

9. A telecommunications line interface circuit for coupling a four-wire telecommunications line to a transmit line and a receive line, comprising:

a first transformer having a center-tapped first winding for coupling to a first pair of wires of the four-wire telecommunications line and having a second winding;

a first amplifier having an input for coupling to the receive line and having a low impedance output coupled to the second winding of the first transformer and providing a low impedance termination thereof;

a second transformer having a center-tapped first winding for coupling to a second pair of wires of the four-wire telecommunications line and having a second winding;

a second amplifier having an input coupled to the second winding of the second transformer and an output for coupling to the transmit line; and a connection between center taps of the first windings of the first and second transformers for conducting a direct current on the telecommunications line through said first windings.

10. An interface circuit for a four-wire telecommunications line, comprising:

first and second transformers each having a center-tapped first winding and a second winding, the first windings of the first and second transformers being arranged for coupling each to a respective pair of wires of a four-wire telecommunications line;

connection means between the center taps of the first windings;

a first amplifier having an output coupled to the second winding of the first transformer and providing a low impedance termination thereof, for supplying signals via the first transformer to the pair of wires of the four-wire telecommunications line coupled thereto, wherein a significant part of the terminating impedance for the telecommunications line is constituted by the resistance of the first winding of the first transformer; and a second amplifier having an input coupled to the second winding of the second transformer for deriving signals via the second transformer from the pair of wires of the four-wire telecommunications coupled thereto.

11. An interface circuit as claimed in claim 10 wherein the first winding of the first transformer comprises resistance wire.

12. An interface circuit as claimed in claim 10 wherein the first winding of the second transformer comprises resistance wire.

13. A method of interfacing a two-wire telecommunications line comprising two wires carrying a direct current in opposite directions, comprising the steps of:

coupling first windings of first and second transformers in series between the two wires to conduct said direct current therebetween;

terminating a second winding of the first transformer with a low impedance output of a first amplifier, wherein a significant part of the terminating impedance for the telecommunications line is constituted by the resistance of the first winding of the first transformer;

supplying a signal from a receive line via the first amplifier and the first transformer to the two-wire telecommunications line;

coupling a second winding of the second transformer via a second amplifier to a transmit line for supplying to the transmit line a signal received via the two-wire telecommunications line; and coupling a component of the signal from the receive line to the second amplifier for substantially cancelling from the signal supplied to the transmit line signal components from the receive line.

14. A method as claimed in claim 13 wherein the step of coupling a component of the signal from the receive line to the second amplifier comprises deriving said component from an output of the first amplifier.

15. A method as claimed in claim 13 wherein the step of coupling a component of the signal from the receive line to the second amplifier comprises deriving said component from the receive line before an input of the first amplifier.

16. A method as claimed in claim 13 and including the step of providing the first winding of the first transformer of resistance wire to have a predetermined resistance.

17. A telecommunications line interface circuit for coupling a telecommunications line to a transmit line and a receive line, comprising:
   a first transformer having a first winding for coupling to the telecommunications line and having a second winding;
   a first amplifier having an input for coupling to the receive line and having a low impedance output coupled to the second winding of the first transformer and providing a low impedance termination thereof, wherein a significant part of the terminating impedance for the telecommunications line is constituted by the resistance of the first winding of the first transformer;
   a second transformer having a first winding for coupling to the telecommunications line and having a second winding;
   a second amplifier having an input coupled to the second winding of the second transformer and an output for coupling to the transmit line;
   means interconnecting the first windings of the first and second transformers in series for conducting a direct current on the telecommunications line through said first windings; and
   a balance impedance coupled between the output of the first amplifier and an input of the second amplifier.

18. A line interface circuit as claimed in claim 17 wherein the first winding of one of the first and second transformers comprises two substantially equal winding halves, and the first winding of the other of the first and second transformers is connected between said winding halves and in series therewith.

19. A telecommunications line interface circuit for coupling a telecommunications line to a transmit line and a receive line, comprising:
   a first transformer having a first winding for coupling to the telecommunications line and having a second winding;
   a first amplifier having an input for coupling to the receive line and having a low impedance output coupled to the second winding of the first transformer and providing a low impedance termination thereof, wherein a significant part of the terminating impedance for the telecommunications line is constituted by the resistance of the first winding of the first transformer;
   a second transformer having a first winding for coupling to the telecommunications line and having a second winding;
   a second amplifier having an input coupled to the second winding of the second transformer and an output for coupling to the transmit line;
   means interconnecting the first windings of the first and second transformers in series for conducting a direct current on the telecommunications line through said first windings; and
   a balance impedance coupled between the receive line and an input of the second amplifier.

20. A line interface circuit as claimed in claim 19 and including a third amplifier having an input coupled to the second winding of the second transformer and having an output, and an impedance coupled between the output of the third amplifier and an input of the first amplifier.

21. A line interface circuit as claimed in claim 20 wherein the input of the second amplifier is coupled to the second winding of the second transformer via the third amplifier.

22. A line interface circuit as claimed in claim 20 wherein the first winding of one of the first and second transformers comprises two substantially equal winding halves, and the first winding of the other of the first and second transformers is connected between said winding halves and in series therewith.

23. A line interface circuit as claimed in claim 9 wherein the first winding of the second transformer comprises resistance wire.

24. A line interface circuit as claimed in claim 9 wherein the first winding of the first transformer comprises resistance wire.

* * * * *